United States Patent
Huang et al.

(10) Patent No.: US 9,355,460 B1
(45) Date of Patent: May 31, 2016

(54) MOTION DETECTION METHOD BASED ON GREY RELATIONAL ANALYSIS

(71) Applicant: Top Victory Investments Ltd., Kowloon (HK)

(72) Inventors: Shih-Chia Huang, New Taipei (TW); Bo-Hao Chen, New Taipei (TW); Ming-Kai Jiau, New Taipei (TW); Tim Wu, New Taipei (TW); Jerry Lian, New Taipei (TW)

(73) Assignee: Top Vicotry Investments Ltd., Kowloon (HK)

( * ) Notice: Subject to any disclaimer, the term of this patent is extended or adjusted under 35 U.S.C. 154(b) by 0 days.

(21) Appl. No.: 14/663,540

(22) Filed: Mar. 20, 2015

(51) Int. Cl.
| | |
|---|---|
| *G06K 9/00* | (2006.01) |
| *G06T 7/20* | (2006.01) |
| *G06T 7/00* | (2006.01) |

(52) U.S. Cl.
CPC ............... *G06T 7/20* (2013.01); *G06T 7/0051* (2013.01); *G06T 7/0081* (2013.01); *G06T 2207/10016* (2013.01); *G06T 2207/20144* (2013.01)

(58) Field of Classification Search
USPC ........................................................ 382/103
See application file for complete search history.

(56) References Cited

U.S. PATENT DOCUMENTS

| | | | | |
|---|---|---|---|---|
| 5,969,766 | A * | 10/1999 | Kim ..................... | G06T 7/2013 348/699 |
| 2001/0040924 | A1 * | 11/2001 | Hori ..................... | G06T 7/2033 375/240.16 |
| 2002/0057343 | A1 * | 5/2002 | Ronk ................ | G06F 17/30256 348/169 |
| 2002/0063702 | A1 * | 5/2002 | Wada ...................... | H04N 5/20 345/204 |
| 2003/0026479 | A1 * | 2/2003 | Thomas ................ | G06T 7/0081 382/173 |
| 2003/0044071 | A1 * | 3/2003 | Kaneko .................... | G06K 9/48 382/190 |
| 2003/0086496 | A1 * | 5/2003 | Zhang ................ | G06K 9/00711 375/240.16 |
| 2010/0061658 | A1 * | 3/2010 | Yamada ................ | G06T 7/0081 382/282 |
| 2012/0188394 | A1 * | 7/2012 | Park .................... | H04N 5/23212 348/222.1 |
| 2012/0322551 | A1 * | 12/2012 | Brennan ............... | G06T 7/2006 463/31 |

* cited by examiner

*Primary Examiner* — Alex Liew
(74) *Attorney, Agent, or Firm* — Alan D. Kamrath; Kamrath IP Lawfirm, P.A.

(57) ABSTRACT

A motion detection method determines bit-rate changes of input pixels of a video frame by a grey relational analysis technique to establish a multi-quality background model, detects moving objects by two-stage block-based and pixel-based detection procedures to generate a binary motion mask, detects luminance changes of the video frame by entropy calculation to timely update the background model, provides a setting interface for a user to set a detection sensitivity, and examines false detections of the binary motion mask. Therefore, it can correctly interpret moving objects in VBR video streams, implement more accurate and complete motion detection, eliminate the influence of luminance changes, increase the detection accuracy, and decrease false detections.

10 Claims, 6 Drawing Sheets

MOTION DETECTION METHOD BASED ON GREY RELATIONAL ANALYSIS

BACKGROUND OF THE INVENTION

1. Field of the Invention

The present invention relates to an image processing method and, more particularly, to a motion detection method for extracting information regarding moving objects from video streams.

2. Description of the Related Art

Motion detection is a key technique used in automatic video surveillance systems to extract information regarding moving objects from video streams. Motion detection methods can be divided into three major categories: temporal difference, optical flow, and background subtraction methods. Temporal difference method is easy to implement, and calculated amount is little; however, it very often generates holes inside moving objects and inevitably extracts incomplete shapes of moving objects. Optical flow method can extract complete shapes of moving objects and can detect moving objects when the camera is moving; however, it is not suitable for real-time applications due to large calculated amount and sensitive to noise. Background subtraction method is easy to implement and can extract reasonable information regarding moving objects with moderate calculated amount by using background models under a relatively static background; however, it is extremely sensitive to luminance changes. Therefore, background subtraction methods have been popularly used in motion detection applications, and various types of background subtraction methods such as Gaussian mixtures model (GMM), sigma difference estimation (SDE), multiple SDE (MSDE), multiple temporal difference (MTD), and simple statistical difference (SSD) methods have been developed.

With recent advances in video communication technology, wireless communication has become more viable for motion detection applications as a way to enhance measurement capabilities in a wide range of detection of moving objects. Unfortunately, wireless communication is especially prone to network congestion and server crashes due to the bandwidth constraints of real-world networks. In response, a video rate control technique has been introduced in video streams such as H.264/AVC video format which supports variable-bit-rate (VBR) encoding to adapt real-world network conditions. The aforementioned conventional background subtraction methods can detect moving objects in video streams which have fixed bit rates. In such an ideal, stable environment, moving objects are easily distinguished by the background models of these methods. However, because real-world networks rarely offer an ideal, stable environment, the aforementioned conventional background subtraction methods possibly misinterpret moving objects when the bit rate suddenly changes, and effective detection of moving objects in VBR video streams is a very difficult problem for these methods.

Figure 6:
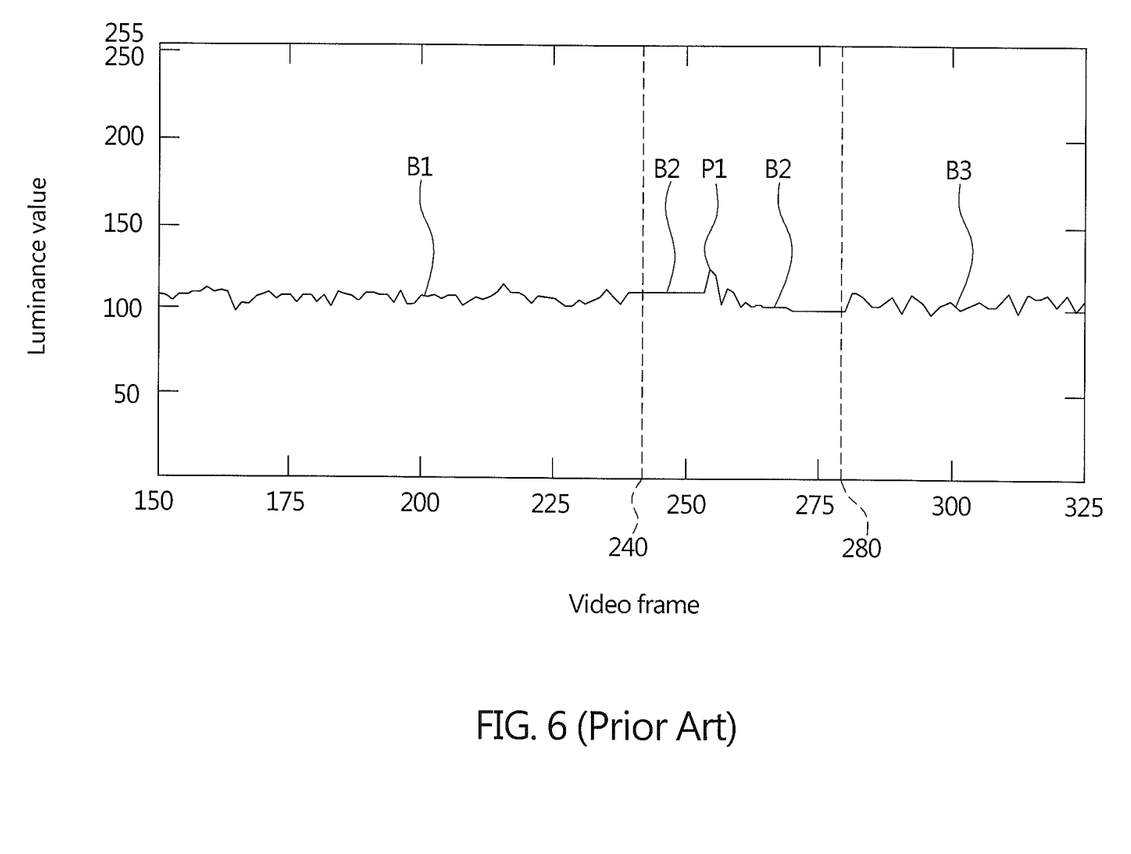
FIG. 6 is a diagram showing luminance values of pixels at the same position of several video frames in a VBR video stream.

For example, referring to FIG. 6, there is illustrated a diagram showing luminance values of pixels at the same position of several video frames in a VBR video stream. In the beginning at the $150^{th}$ video frame, the video stream has a high bit rate of 200 kbps and has a strong, fluctuant (or high-quality) background signal B1 accordingly. The conventional background subtraction methods generate background models according to the strong, fluctuant background signal B1. When video communication is hindered by network congestion, the video rate control technique allocates the remaining network bandwidth, and subsequently, at the $240^{th}$ video frame, the video stream becomes to have a low bit rate of 5 kbps and have a smooth (or low-quality) background signal B2 with a strong, fluctuant motion signal P1 due to a passing moving object. If the motion signal P1 is present while the background model is not yet updated (that is, still generated according to the strong, fluctuant background signal B1), the conventional background subtraction methods possibly misinterpret the motion signal P1 as a background signal. After a period of time, the background model is updated according to the smooth background signal B2. However, when video communication is not hindered at the $280^{th}$ video frame, the video stream is restored to have a high bit rate of 200 kbps and have a strong, fluctuant (or high-quality) background signal B3. If the background signal B3 is present while the background model is not yet updated (that is, still generated according to the smooth background signal B2), the conventional background subtraction methods possibly misinterpret the background signal B3 as a motion signal. Therefore, the conventional background subtraction methods possibly misinterpret when the bit rate of video streams changes from high to low, or from low to high.

SUMMARY OF THE INVENTION

The present invention is adapted to providing a motion detection method, which can correctly interpret moving objects in VBR video streams to implement more accurate and complete motion detection, and can eliminate the influence of luminance changes.

According to an aspect of the present invention, there is provided a motion detection method based on grey relational analysis. The motion detection method includes the following steps: S1) receiving a video frame including a plurality of input pixels; S2) establishing a multi-quality background model; S3) detecting moving objects; S4) detecting luminance changes of the video frame; S5) examining false detections of the binary motion mask.

Moreover, the step of S2 includes: S21) calculating a Euclidean distance between a pixel value of each input pixel and a pixel value of each of a plurality of corresponding candidate background pixels; S22) according to the Euclidean distances, calculating a grey relational coefficient between the pixel value of each input pixel and the pixel value of each of the corresponding candidate background pixels; S23) for each input pixel, determining whether the minimum value of the grey relational coefficients is smaller than or equal to a first threshold value; if yes, determining that a bit rate of the input pixel has been changed, and the input pixel is regarded as a new candidate background pixel accordingly; if no, determining that the bit rate of the input pixel is not changed.

Moreover, the step of S3 includes: S31) dividing the video frame into a plurality of blocks, and for each block, summing up the maximum values of the grey relational coefficients between the pixel value of each input pixel and the pixel values of the corresponding candidate background pixels within the block to generate a grey relational coefficient sum regarding the block; S32) determining whether the grey relational coefficient sum is larger than or equal to a second threshold value; if yes, determining that the block is a background block; if no, determining that the block is a motion block; S33) for each input pixel within each motion block, determining whether the maximum value of the grey relational coefficients between the pixel value of each input pixel and the pixel values of the corresponding candidate background pixels is larger than or equal to a third threshold value; if yes, determining that the input pixel is a background pixel;

if no, determining that the input pixel is a motion pixel; S34) generating a binary motion mask.

Moreover, the step of S4 includes: S41) calculating an entropy of the grey relational coefficient sum of each block, and summing up the entropies of the grey relational coefficient sums of the blocks to generate an entropy sum regarding the video frame; S42) determining whether a difference between the entropy sum of the video frame and an entropy sum of a previous video frame is larger than or equal to a fourth threshold value; if yes, determining that the video frame has luminance changes, and updating a candidate background pixel corresponding to each input pixel according to the video frame; if no, determining that the video frame has no luminance changes.

Moreover, the step of S5 includes: S51) providing a setting interface for a user to set a detection sensitivity; S52) dividing a total number of the motion pixels and the background pixels of the binary motion mask by an area of the binary motion mask to generate an examination value; S53) determining whether the examination value is larger than a product of a fifth threshold value and the detection sensitivity, wherein a prediction number of true positive pixels divided by the area of the binary motion mask is the fifth threshold value; if yes, determining that there are false detections; if no, determining that there are no false detections.

The motion detection method determines bit-rate changes of the input pixels by the grey relational analysis technique to establish the multi-quality background model, and therefore can correctly interpret moving objects in VBR video streams. The motion detection method further detects moving objects by two-stage detection procedures (i.e. block-based and pixel-based detection procedures) to generate the binary motion mask, and therefore can implement more accurate and complete motion detection. The motion detection method further detects luminance changes of the video frame by entropy calculation to timely update the background model, and therefore can eliminate the influence of luminance changes. The motion detection method further provides the setting interface for the user to set the detection sensitivity with higher values meaning higher detection accuracy, and examines false detections of the binary motion mask; therefore, it can increase the detection accuracy and decrease false detections.

BRIEF DESCRIPTION OF THE DRAWINGS

The present invention will be described in further detail below under reference to the accompanying drawings, in which.

DETAILED DESCRIPTION OF THE INVENTION

Figure 1:
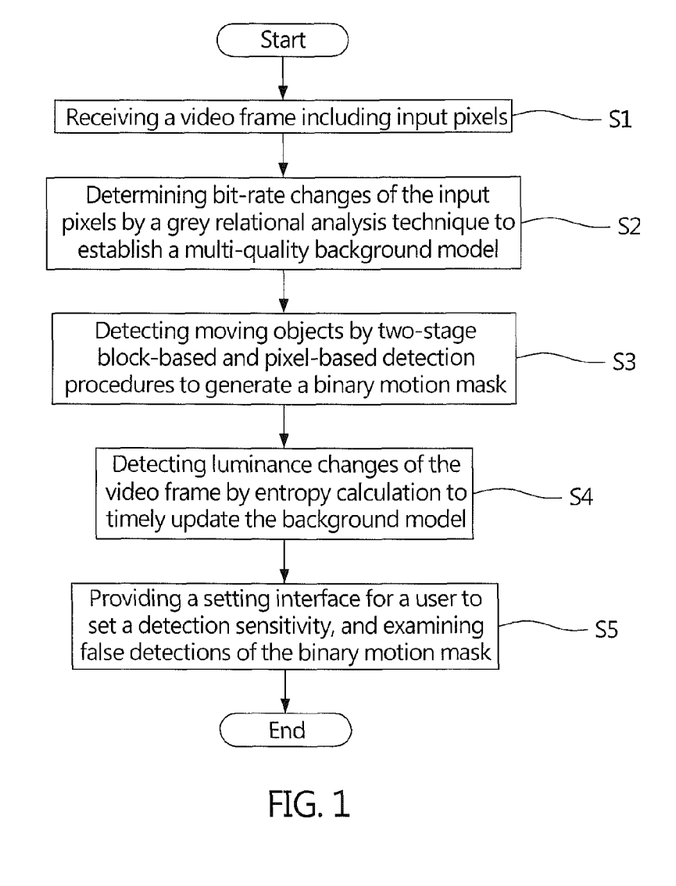
FIG. 1 is a flow chart of a motion detection method based on grey relational analysis according to a preferred embodiment of the invention.

Referring to FIG. 1, there is illustrated a flow chart of a motion detection method based on grey relational analysis according to a preferred embodiment of the invention. In a step S1, the motion detection method receives a video stream including a plurality of video frames. Each video frame includes a plurality of input pixels. For convenience of distinction and explanation, the $t^{th}$ video frame is notated as $I_t$, and an input pixel at a position (x,y) of the $t^{th}$ video frame $I_t$ is notated as $p_t(x,y)$. In the embodiment, the motion detection method is implemented in a $YC_bC_r$ color space, and each input pixel $p_t(x,y)$ has a corresponding color or pixel value represented by three variables: a luminance value (Y), a blue-difference chroma value ($C_b$), and a red-difference chroma value ($C_r$). In addition, each of the luminance value (Y), the blue-difference chroma value ($C_b$), and the red-difference chroma value ($C_r$) can be represented by 8 bits with values of 0 to 255.

Figure 2:
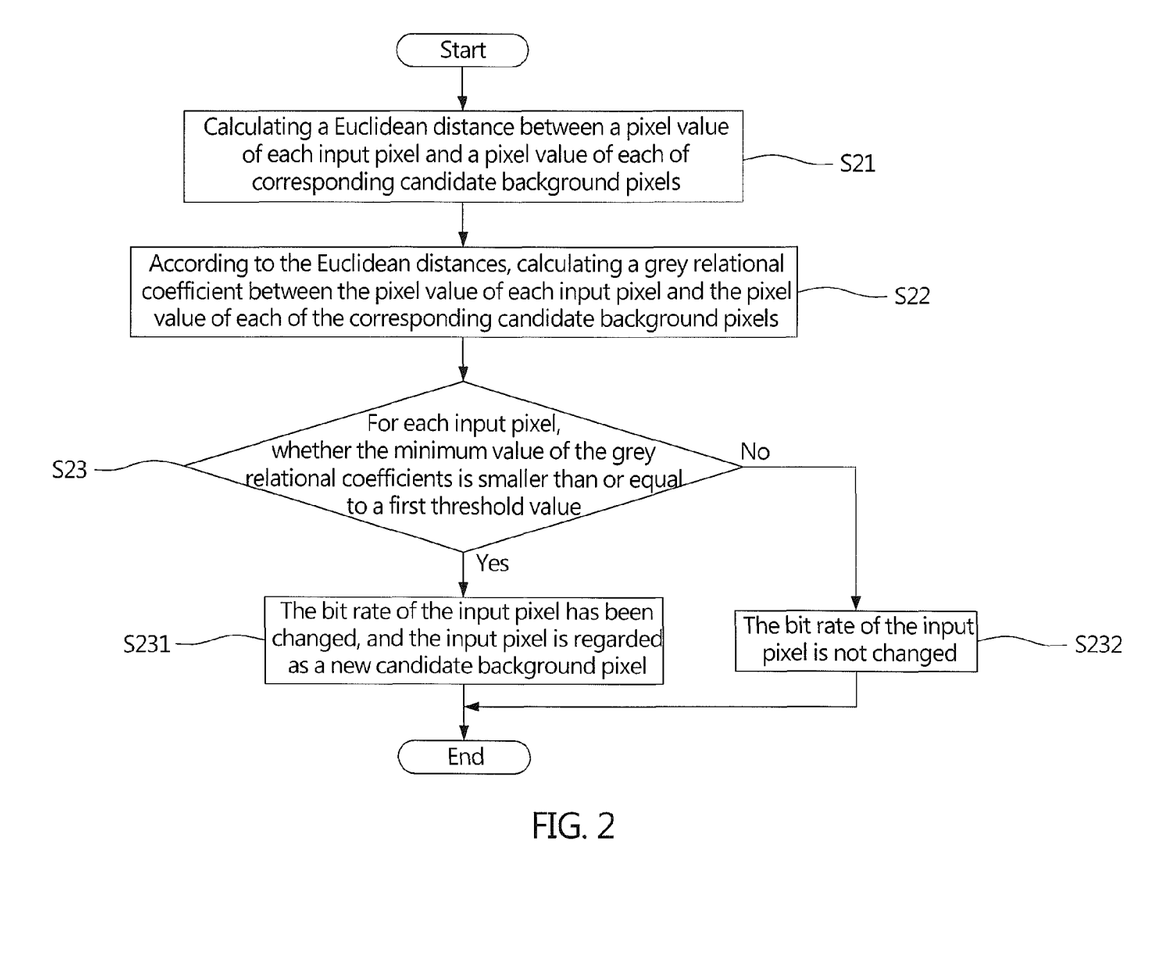
FIG. 2 is a flow chart of a method for establishing a multi-quality background model according to a preferred embodiment of the invention.

In a step S2, the motion detection method determines bit-rate changes of the input pixels by the grey relational analysis technique to establish a multi-quality background model. In the embodiment, referring to FIG. 2, there is illustrated a flow chart of a method for establishing a multi-quality background model according to a preferred embodiment of the invention. In a step S21, the method calculates a Euclidean distance $\Delta$ between a pixel value of each input pixel $p_t(x,y)$ and a pixel value of each of a plurality of corresponding candidate background pixels $B(x,y)_1$ to $B(x,y)_M$. The Euclidean distance $\Delta$ can be expressed for each input pixel $p_t(x,y)$ as follows:

$$\Delta(k) = \|p_t(x,y) - B(x,y)_k\|$$

where k is an integer ranging from 1 to M, and M is the number of corresponding candidate background pixels. Because the motion detection method is implemented in the $YC_bC_r$ color space, each candidate background pixel $B(x,y)_k$ has a corresponding color or pixel value represented by three variables: a luminance value (Y), a blue-difference chroma value ($C_b$), and a red-difference chroma value ($C_r$). The longer Euclidean distance $\Delta(k)$ indicates the larger difference between the input pixel $p_t(x,y)$ and the candidate background pixel $B(x,y)_k$, whereas the shorter Euclidean distance $\Delta(k)$ indicates the smaller difference between the input pixel $p_t(x,y)$ and the candidate background pixel $B(x,y)_k$.

In a step S22, the method calculates, according to the Euclidean distances $\Delta(1)$ to $\Delta(M)$, a grey relational coefficient $\gamma$ between the pixel value of each input pixel $p_t(x,y)$ and the pixel value of each of the corresponding candidate background pixels $B(x,y)_1$ to $B(x,y)_M$. The grey relational coefficient $\gamma$ can be expressed for each input pixel $p_t(x,y)$ as follows:

$$\gamma(p_t(x,y), B(x,y)_k) = \frac{\Delta_{min} + \xi \Delta_{max}}{\Delta(k) + \xi \Delta_{max}}$$

where k is an integer ranging from 1 to M, $\Delta_{min}$ represents the minimum difference, and $\Delta_{max}$ represents the maximum difference. Because each of the luminance value (Y), the blue-difference chroma value ($C_b$), and the red-difference chroma value ($C_r$) is represented by 8 bits with values of 0 to 255, $\Delta_{min}$ and $\Delta_{max}$ can be set to 0 and 255, respectively. In addition, $\xi$ represents a distinguishing coefficient ranging from 0 to 1, and in the embodiment, $\xi$ is set to 0.2. The smaller grey relational coefficient $\gamma(p_t(x,y), B(x,y)_k)$ indicates the lower correlation (i.e. the larger difference) between the input pixel $p_t(x,y)$ and the candidate background pixel $B(x,y)_k$, whereas the larger grey relational coefficient $\gamma(p_t(x,y), B(x,y)_k)$ indicates the higher correlation (i.e. the smaller difference) between the input pixel $p_t(x,y)$ and the candidate background pixel $B(x,y)_k$.

In a step S23, the method determines, for each input pixel $p_t(x,y)$, whether the minimum value of the grey relational coefficients $\gamma(p_t(x,y), B(x,y)_1)$ to $\gamma(p_t(x,y), B(x,y)_M)$ is smaller than or equal to a first threshold value $\epsilon$. If yes, it indicates that there is substantially no correlation between the input pixel $p_t(x,y)$ and the candidate background pixels $B(x,y)_1$ to $B(x,y)_M$, and the method goes to a step S231 accordingly. In the step S231, the method determines that a bit rate of the input pixel $p_t(x,y)$ has been changed, and a bit-rate-change indication $V_k$ of the input pixel $p_t(x,y)$ is labelled as '1'. Moreover, the input pixel $p_t(x,y)$ can be regarded as a new candidate background pixel. If no, it indicates that there is very higher correlation between the input pixel $p_t(x,y)$ and some candidate background pixel, and the method goes to a step S232 accordingly. In the step S232, the method determines that the bit rate of the input pixel $p_t(x,y)$ is not changed, and the bit-rate-change indication $V_k$ of the input pixel $p_t(x,y)$ is labelled as '0'. By doing so, the multi-quality background model can be flexibly established in the VBR video stream. The bit-rate-change indication $V_k$ can be expressed for each input pixel $p_t(x,y)$ as follows:

$$V_k = \begin{cases} 1, & \text{if } \min(\gamma(p_t(x,y), B(x,y)_k)) \leq \varepsilon \\ 0, & \text{otherwise} \end{cases}$$

where k is an integer ranging from 1 to M, and the first threshold value $\epsilon$ can be empirically set to 0.6.

Figure 3:
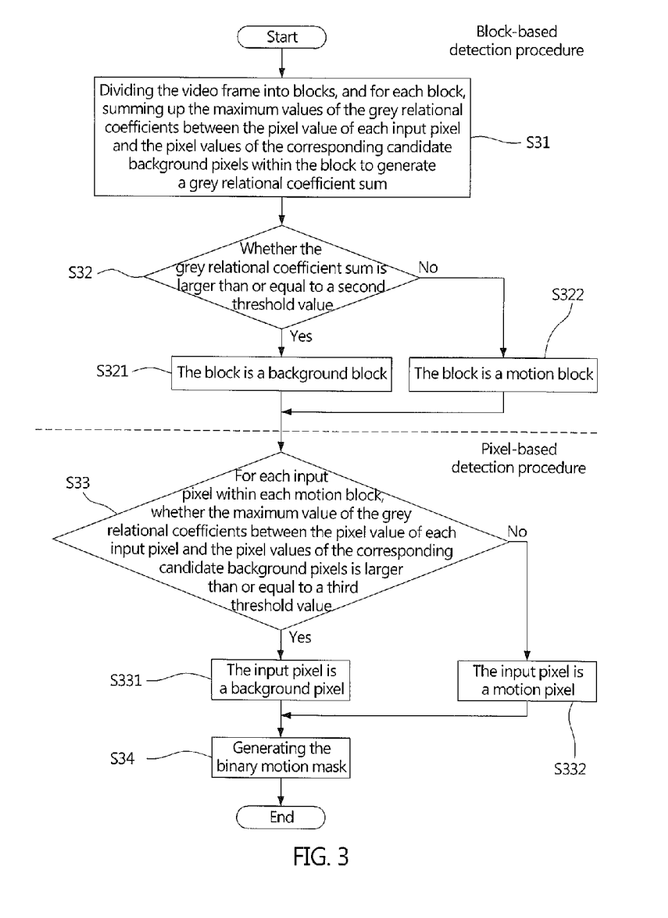
FIG. 3 is a flow chart of a method for detecting moving objects according to a preferred embodiment of the invention.

Referring again to FIG. 2, in a step S3, the motion detection method detects moving objects by two-stage detection procedures (i.e. block-based and pixel-based detection procedures) to generate a binary motion mask. In the embodiment, referring to FIG. 3, there is illustrated a flow chart of a method for detecting moving objects according to a preferred embodiment of the invention. The block-based detection procedure includes steps S31, S32, S321, and S322. In the step S31, the method divides the video frame $I_t$ into a plurality of blocks $M(i,j)$. In the embodiment, according to MacroBlock types supported by H.264 video encoding, the video frame $I_t$ is divided into 16×16 blocks $M(1,1)$ to $M(1,16)$, $M(2,1)$ to $M(2,16)$, ..., and $M(16,1)$ to $M(16,16)$, which are notated as $M(1,1)$ to $M(16,16)$ hereinafter; in other words, i and j of $M(i,j)$ are integer ranging from 1 to 16. For each block $M(i,j)$, the method sums up the maximum values of the grey relational coefficients $\gamma(p_t(x,y), B(x,y)_1)$ to $\gamma(p_t(x,y), B(x,y)_M)$ between the pixel value of each input pixel $p_t(x,y)$ and the pixel values of the corresponding candidate background pixels $B(x,y)_1$ to $B(x,y)_M$ within the block $M(i,j)$ to generate a grey relational coefficient sum $S(i,j)$ regarding the block $M(i,j)$. The grey relational coefficient sum $S(i,j)$ can be expressed for each block $M(i,j)$ as follows:

$$S(i,j) = \sum_{p_t \in M(i,j)} \max(\gamma(p_t(x,y), B(x,y)_k))$$

where k is an integer ranging from 1 to M.

In the step S32, the method determines whether the grey relational coefficient sum $S(i,j)$ is larger than or equal to a second threshold value $\alpha$. If yes, it indicates that the block $M(i,j)$ is not a motion block, and the method goes to the step S321 accordingly. In the step S321, the method determines that the block $M(i,j)$ is a background block, and a motion block indication $R(i,j)$ of the block $M(i,j)$ is labelled as '0'. If no, it indicates that many input pixels $p_t(x,y)$ within the block $M(i,j)$ are parts of moving objects, and the method goes to the step S322. In the step S322, the method determines that the block $M(i,j)$ is a motion block, and the motion block indication $R(i,j)$ of the block $M(i,j)$ is labelled as '1'. The motion block indication $R(i,j)$ can be expressed for each block $M(i,j)$ as follows:

$$R(i,j) = \begin{cases} 0, & \text{if } S(i,j) \geq \alpha \\ 1, & \text{otherwise} \end{cases}$$

where the second threshold value $\alpha$ can be experimentally set to 245.

The pixel-based detection procedure includes steps S33, S331, S332, and S34. In the step S33, for each input pixel $p_t(x,y)$ within each motion block, the method determines whether the maximum value of the grey relational coefficients $\gamma(p_t(x,y), B(x,y)_1)$ to $\gamma(p_t(x,y), B(x,y)_M)$ between the pixel value of each input pixel $p_t(x,y)$ and the pixel values of the corresponding candidate background pixels $B(x,y)_1$ to $B(x,y)_M$ is larger than or equal to a third threshold value $\beta$. If yes, it indicates that there is very higher correlation between the input pixel $p_t(x,y)$ and some candidate background pixel, and the method goes to the step S331 accordingly. In the step S331, the method determines that the input pixel $p_t(x,y)$ is a background pixel. If no, it indicates that there is substantially no correlation between the input pixel $p_t(x,y)$ and the candidate background pixels $B(x,y)_1$ to $B(x,y)_M$, and the method goes to the step S332 accordingly. In the step S332, the method determines that the input pixel $p_t(x,y)$ is a motion pixel. Next, in the step S34, the method generates a binary motion mask BM which can be expressed as follows:

$$BM(x,y) = \begin{cases} 0, & \text{if } \max(\gamma(p_t(x,y), B(x,y)_k)) \geq \beta \\ 1, & \text{otherwise} \end{cases}$$

where k is an integer ranging from 1 to M, and the third threshold value $\beta$ can be empirically set to 0.6.

Figure 4:
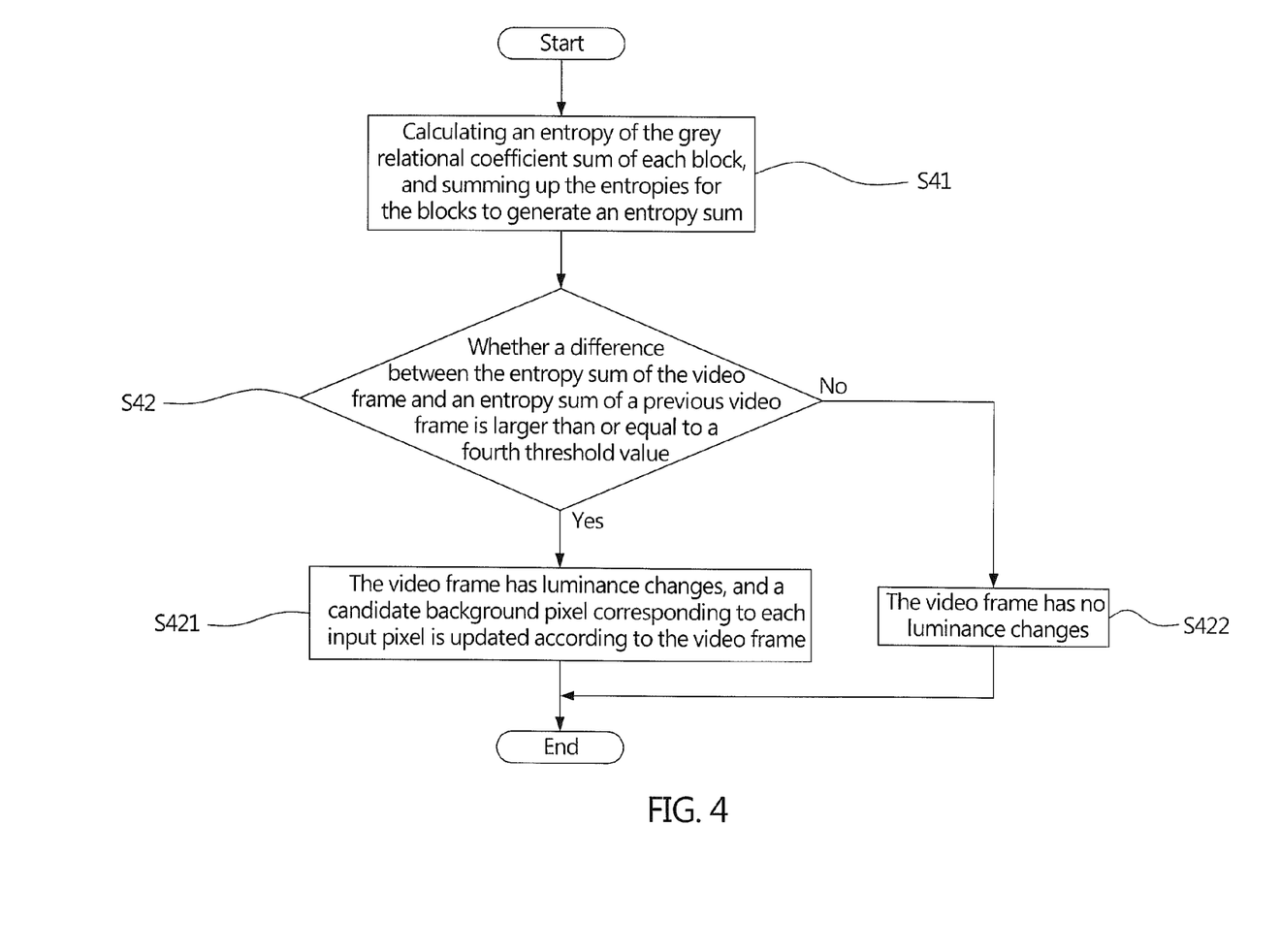
FIG. 4 is a flow chart of a method for detecting luminance changes of a video frame according to a preferred embodiment of the invention.

Referring again to FIG. 2, in a step S4, the motion detection method detects luminance changes of the video frame by entropy calculation to timely update the background model. In the embodiment, referring to FIG. 4, there is illustrated a flow chart of a method for detecting luminance changes of a video frame according to a preferred embodiment of the invention. In a step S41, the method calculates an entropy of the grey relational coefficient sum $S(i,j)$ of each block $M(i,j)$ via the entropy formula—$S(i,j)\log(S(i,j))$, and sums up the entropies regarding the blocks $M(1,1)$ to $M(16,16)$ to generate an entropy sum $E_t$ regarding the video frame $I_t$. The entropy sum $E_t$ can be expressed as follows:

$$E_t = -\sum_{(i,j) \in I_t} S(i,j)\log(S(i,j))$$

In a step S42, the method determines whether a difference between the entropy sum $E_t$ of the video frame $I_t$ and an entropy sum $E_{t-1}$ of a previous video frame $I_{t-1}$, i.e. $|E_t - E_{t-1}|$, is larger than or equal to a fourth threshold value μ. If yes, it indicates that the video frame $I_t$ has sudden luminance changes, and the method goes to a step S421. In the step S421, the method determines that the video frame $I_t$ has luminance changes, and a luminance-change indication $L_t$ is labelled as '1'. If no, the method goes to a step S422 to determine that the video frame $I_t$ has no luminance changes, and the luminance-change indication $L_t$ is labelled as '0'. The luminance-change indication $L_t$ can be expressed as follows:

$$L_t = \begin{cases} 1, & \text{if } |E_t - E_{t-1}| \geq \mu \\ 0, & \text{otherwise} \end{cases}$$

where the fourth threshold value μ can be empirically set to 0.05. Furthermore, in the step S421, because the method determines that the video frame $I_t$ has luminance changes, it can update a candidate background pixel $B(x,y)_s$ corresponding to each input pixel $p_t(x,y)$ according to the video frame $I_t$ as follows:

$$B(x,y)'_s = B(x,y)_s + \rho(p_t(x,y) - B(x,y)_s)$$

where $B(x,y)_s$ represents a candidate background pixel at a position (x,y) which will be updated, $B(x,y)'_s$ represents a updated candidate background pixel at the position (x,y), and ρ represents a default parameter. The candidate background pixel $B(x,y)_s$ which will be updated can be chosen from a candidate background pixel corresponding to the maximum value of the Euclidean distances Δ(1) to Δ(M). The candidate background pixel $B(x,y)_s$ which will be updated can be expressed as follows:

$$B(x,y)_s = \arg\max_{k=1 \text{ to } M} \Delta(k)$$

Figure 5:
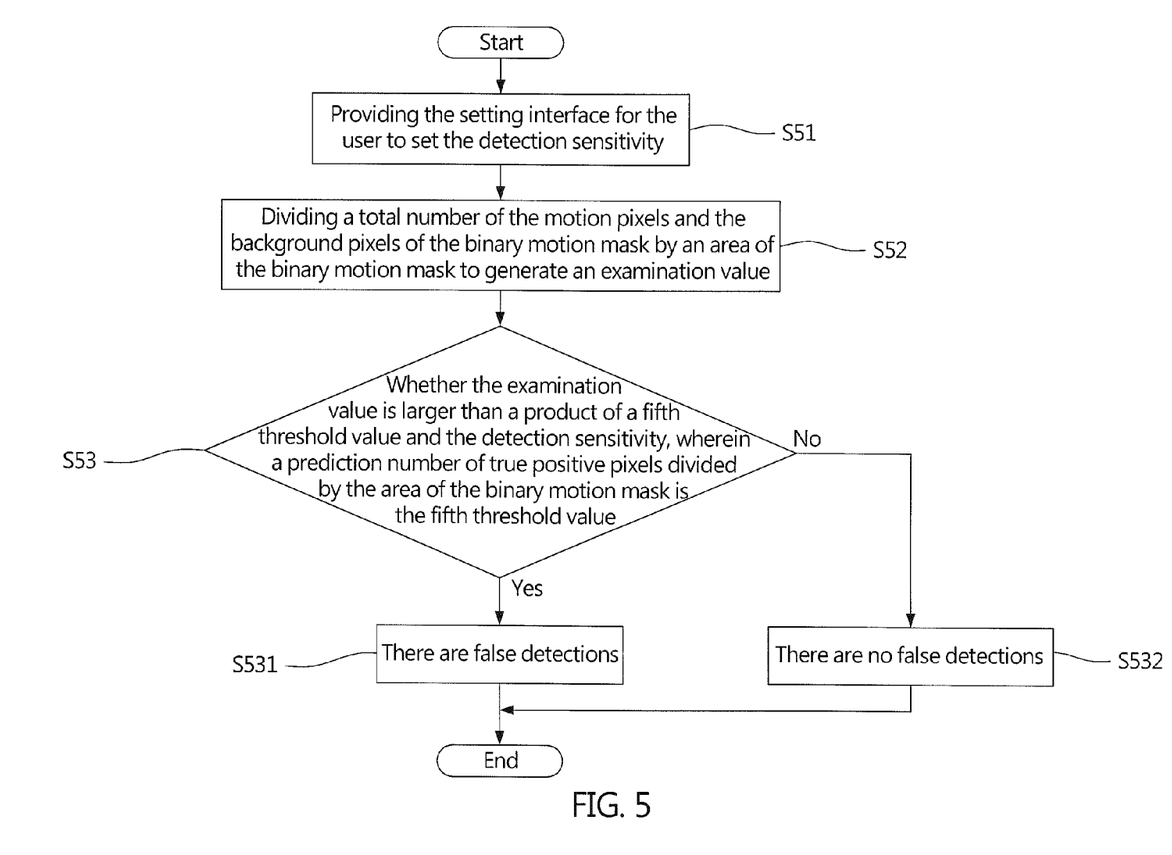
FIG. 5 is a flow chart of a method for examining false detections of a binary motion mask according to a preferred embodiment of the invention.

Referring again to FIG. 2, in a step S5, the motion detection method provides an adjustable detection sensitivity and examines false detections of the binary motion mask BM. In the embodiment, referring to FIG. 5, there is illustrated a flow chart of a method for examining false detections of a binary motion mask according to a preferred embodiment of the invention. In a step S51, the method provides a setting interface for a user to set the detection sensitivity ds. For example, the setting interface is a graphical user interface having a bar with a slide, and the detection sensitivity ds can be adjusted from 0 to 10. The higher detection sensitivity ds indicates the higher detection accuracy, whereas the lower detection sensitivity ds indicates the lower detection accuracy In a step S52, the method divides a total number $n_{dp}$ of the motion pixels and the background pixels of the binary motion mask BM by an area of the binary motion mask BM to generate an examination value $E_{BM}$. The examination value $E_{BM}$ can be expressed as follows:

$$E_{BM} = \frac{n_{dp}}{dimX\,dimY}$$

where $n_{dp} = p_p + p_n$, $p_p$ represents the number of the motion pixels of the binary motion mask BM, $p_n$ represents the number of the background pixels of the binary motion mask BM, and dimX and dimY represent the width and the height of the binary motion mask BM, respectively.

In a step S53, the method determines whether the examination value $E_{BM}$ is larger than a product of a fifth threshold value δ and the detection sensitivity ds, wherein a prediction number Ω of true positive pixels divided by the area of the binary motion mask BM is the fifth threshold value δ. The fifth threshold value δ can be expressed as follow:

$$\delta = \frac{\Omega}{dimX\,dimY}$$

If yes, $E_{BM} > \delta \times ds$, and the method goes to a step S531. In the step S531, the method determines that there are false detections in the binary motion mask BM, and a fault alarm indication F is labelled as '1'. If no, $E_{BM} \leq \delta \times ds$, and the method goes to a step S532. In the step S532, the method determines that there are no false detections in the binary motion mask BM, and the fault alarm indication F is labelled as '0'. The fault alarm indication F can be expressed as follows:

$$F = \begin{cases} 1, & \text{if } E_{BM} > \delta \times ds \\ 0, & \text{otherwise} \end{cases}$$

where the prediction number Ω of true positive pixels can be experimentally set to 30×30.

It will be apparent to those skilled in the art that various modifications and variations can be made to the structure of the present invention without departing from the scope or spirit of the present invention. In view of the foregoing, it is intended that the present invention cover modifications and variations of this invention provided they fall within the scope of the following claims and their equivalents.

What is claimed is:

1. A motion detection method based on grey relational analysis, comprising:
   S1) receiving a video frame comprising a plurality of input pixels;
   S2) establishing a multi-quality background model, comprising:
      S21) calculating a Euclidean distance between a pixel value of each input pixel and a pixel value of each of a plurality of corresponding candidate background pixels;
      S22) according to the Euclidean distances, calculating a grey relational coefficient between the pixel value of each input pixel and the pixel value of each of the corresponding candidate background pixels;
      S23) for each input pixel, determining whether the minimum value of the grey relational coefficients is smaller than or equal to a first threshold value; if yes, determining that a bit rate of the input pixel has been changed, and the input pixel is regarded as a new candidate background pixel accordingly; if no, determining that the bit rate of the input pixel is not changed;
   S3) detecting moving objects, comprising:
      S31) dividing the video frame into a plurality of blocks, and for each block, summing up the maximum values of the grey relational coefficients between the pixel value of each input pixel and the pixel values of the corresponding candidate background pixels within the block to generate a grey relational coefficient sum regarding the block;
      S32) determining whether the grey relational coefficient sum is larger than or equal to a second threshold value; if yes, determining that the block is a background block; if no, determining that the block is a motion block;

S33) for each input pixel within each motion block, determining whether the maximum value of the grey relational coefficients between the pixel value of each input pixel and the pixel values of the corresponding candidate background pixels is larger than or equal to a third threshold value; if yes, determining that the input pixel is a background pixel; if no, determining that the input pixel is a motion pixel;

S34) generating a binary motion mask;

S4) detecting luminance changes of the video frame, comprising:

S41) calculating an entropy of the grey relational coefficient sum of each block, and summing up the entropies of the grey relational coefficient sums of the blocks to generate an entropy sum regarding the video frame;

S42) determining whether a difference between the entropy sum of the video frame and an entropy sum of a previous video frame is larger than or equal to a fourth threshold value; if yes, determining that the video frame has luminance changes, and updating a candidate background pixel corresponding to each input pixel according to the video frame; if no, determining that the video frame has no luminance changes;

S5) examining false detections of the binary motion mask, comprising:

S51) providing a setting interface for a user to set a detection sensitivity;

S52) dividing a total number of the motion pixels and the background pixels of the binary motion mask by an area of the binary motion mask to generate an examination value;

S53) determining whether the examination value is larger than a product of a fifth threshold value and the detection sensitivity, wherein a prediction number of true positive pixels divided by the area of the binary motion mask is the fifth threshold value; if yes, determining that there are false detections; if no, determining that there are no false detections.

2. The motion detection method of claim 1, wherein the candidate background pixel corresponding to the input pixel which will be updated is chosen from a candidate background pixel corresponding to the maximum value of the Euclidean distances between the pixel value of the input pixel and the pixel value of the corresponding candidate background pixels.

3. The motion detection method of claim 1, wherein each of the pixel values of the input pixels and the candidate background pixels comprises a luminance value, a blue-difference chroma value, and a red-difference chroma value.

4. The motion detection method of claim 3, wherein each of the luminance value, the blue-difference chroma value, and the red-difference chroma value is represented by 8 bits.

5. The motion detection method of claim 4, wherein the first threshold value is set to 0.6.

6. The motion detection method of claim 4, wherein the second threshold value is set to 245.

7. The motion detection method of claim 4, wherein the third threshold value is set to 0.6.

8. The motion detection method of claim 4, wherein the fourth threshold value is set to 0.05.

9. The motion detection method of claim 1, wherein the prediction number of true positive pixels is set to 30×30, and the detection sensitivity is set to 0 to 10 by the user.

10. The motion detection method of claim 1, wherein the blocks are 16×16 blocks.

* * * * *